United States Patent [19]

Weathers et al.

[11] 3,826,908

[45] July 30, 1974

[54] DATA TELECOMMUNICATIONS ANALYZER

[75] Inventors: Luther V. Weathers; Karl I. Nordling; Ronald C. Ruffner, all of Clearwater, Fla.

[73] Assignee: Paradyne Corporation, Clearwater, Fla.

[22] Filed: Feb. 5, 1973

[21] Appl. No.: 329,899

[52] U.S. Cl. .......... 235/153 R

[51] Int. Cl. .......... G06f 11/00

[58] Field of Search... 235/153 R, 153 AC, 153 AK; 340/172.5, 146.1 R

[56] References Cited

UNITED STATES PATENTS

| | | | |
|---|---|---|---|
| 3,364,473 | 1/1968 | Reitz et al. | 340/172.5 |
| 3,382,487 | 5/1968 | Sharon et al. | 340/172.5 |
| 3,631,455 | 12/1971 | Gregg, Jr. | 340/172.5 |

*Primary Examiner*—Charles E. Atkinson
*Attorney, Agent, or Firm*—Stein and Orman

[57] ABSTRACT

A protocol analyzer for monitoring line control characters in a binary synchronous data telecommunications system comprising a control character trap means having a character decode means and character memory means to decode and buffer any of a plurality of predetermined line control characters and a visual display means to selectively observe the buffered control characters. The analyzer also includes an interface test means to monitor and display standard EIA RS-232 control lines and DAA control line signals from the business equipment means and data communications lines respectively and an analog test means including visual and audio display means for monitoring data communications line signals.

21 Claims, 10 Drawing Figures

| Character | Hex |
|---|---|
| A | C1 |
| B | C2 |
| C | C3 |
| D | C4 |
| E | C5 |
| F | C6 |
| G | C7 |
| H | C8 |
| I | C9 |
| J | D1 |
| K | D2 |
| L | D3 |
| M | D4 |
| N | D5 |
| O | D6 |
| P | D7 |
| Q | D8 |
| R | D9 |
| S | E2 |
| T | E3 |
| U | E4 |
| V | E5 |
| W | E6 |
| X | E7 |
| Y | E8 |
| Z | E9 |
| a | 81 |
| b | 82 |
| c | 83 |
| d | 84 |
| e | 85 |
| f | 86 |
| g | 87 |
| h | 88 |
| i | 89 |
| j | 91 |
| k | 92 |
| l | 93 |
| m | 94 |
| n | 95 |
| o | 96 |
| p | 97 |
| q | 98 |
| r | 99 |
| s | A2 |
| t | A3 |
| u | A4 |
| v | A5 |
| w | A6 |
| x | A7 |
| y | A8 |
| z | A9 |

| Character | Hex |
|---|---|
| 0 | F0 |
| 1 | F1 |
| 2 | F2 |
| 3 | F3 |
| 4 | F4 |
| 5 | F5 |
| 6 | F6 |
| 7 | F7 |
| 8 | F8 |
| 9 | F9 |
| & | 50 |
| — | 60 |
| / | 61 |
| $ | 5B |
| ¢ | 4A |
| ! | 5A |
| : | 7A |
| # | 7B |
| , | 6B |
| . | 4B |
| < | 4C |
| * | 5C |
| % | 6C |
| @ | 7C |
| ( | 4D |
| ) | 5D |
| _ | 6D |
| ' | 7D |
| + | 4E |
| ; | 5E |
| > | 6E |
| = | 7E |
| \| | 4F |
| ¬ | 5F |
| ? | 6F |
| " | 7F |
| { | C0 |
| } | D0 |
| \ | E0 |
| ~ | A1 |
| ` | 79 |
| ¦ | 6A |
| BEL | 2F |
| BS | 16 |
| BYP | 24 |
| CAN | 18 |
| CC | 1A |
| CR | 0D |
| DC1 | 11 |
| DC2 | 12 |
| DC3 | 13 |
| DC4 | 3C |

| Character | Hex |
|---|---|
| DEL | 07 |
| DLE | 10 |
| DS | 20 |
| EM | 19 |
| ENQ | 2D |
| *EOB | 26 |
| EOT | 37 |
| *ESC | 27 |
| *ETB | 26 |
| ETX | 03 |
| FF | 0C |
| FS | 22 |
| HT | 05 |
| IFS | 1C |
| IGS | 1D |
| IL | 17 |
| IRS | 1E |
| IUS | 1F |
| LC | 06 |
| LF | 25 |
| NAK | 3D |
| NL | 15 |
| NUL | 00 |
| PF | 04 |
| PN | 34 |
| *PRE | 27 |
| RES | 14 |
| RLF | 09 |
| RS | 35 |
| SI | 0F |
| SM | 2A |
| SMM | 0A |
| SO | 0E |
| SOH | 01 |
| SOS | 21 |
| Space | 40 |
| STX | 02 |
| SUB | 3F |
| SYN | 32 |
| UC | 36 |
| VT | 0B |

**ETB and EOB have the same hex assignment. PRE and ESC have the same hex assignment.*

FIG. 5.

TRANSPARENT TEXT (MULTIPLE RECORD)

| | | | | | | | | | | | | | | | |
|---|---|---|---|---|---|---|---|---|---|---|---|---|---|---|---|
| Transmitting Station | DLE | STX | TEXT | DLE | IUS | bcc | bcc | DLE | STX[4] | TEXT | DLE | ETB | bcc | bcc | |
| Receiving Station | | | | | | | | | | | | | | | ACK 1 or 0 |

[4] *This DLE STX is required when operating in Transparent mode*

FIG. 10

DATA TELECOMMUNICATIONS ANALYZER

BACKGROUND OF THE INVENTION

1. Field of the Invention

A protocol analyzer for monitoring line control characters in binary synchronous data communications systems including a control character trap means to decode and buffer predetermined line control characters in sequential order as received.

2. Description of the Prior Art

Most existing data communication systems requiring an immediate transfer of data between a computer and a distant computer or I/O device normally use voice-grade telephone lines or special dedicated lines between locations as the transmission medium. To transfer data signals over this transmission medium, the DC pulse output signals of the computer or terminal equipment is converted to an audio signal for transmission. At the remote site, the audio signal is reconverted to the original DC pulse signal.

When a data communications user installs his own system he generally integrates a number of separate components or sub-systems such as terminals, modems, printers, interfaces and the like into a complete data communications system. Often these components or sub-systems are obtained from different vendors. As a result, once such an integrated system is assembled and operating the problems of "trouble shooting" system malfunctions are generally compounded due to the various interfaces. Frequently a user's system remains inoperative while representatives from the various vendors report that they have checked their portions of the system and found that they are operating properly.

A common source of transmission problems are faults which result when such electrical parameters as line distortion and phase are out of performance specifications. In addition serious failures often arise from incompatibility in line control protocol between terminal and computer, terminal and modem, modem and modem, modem and phone-line interface, and software programs.

Since the line-control protocol defines the code used, control characters and meaning, message formats, reply formats and rules for responding to different messages, system incompatibilities are unacceptable. Examples of such incompatibilities are: data transmitted in the transparent mode to a device without transparency capability or multiple-record blocks transmitted to a device without multiple-record capability, improper message or response formats, or improper software procedures.

If any device violates any of these rules it usually renders the link inoperable. Thus, it is essential to determine where the incompatibility within the overall system lies. To make this determination it is necessary to have some means of observing the dialog between the two devices. Unfortunately once the control characters are received and the transmission link has been rendered inoperative there is no means to recapture and examine the control character sequence. Thus, there is a need for an integrated system compatible with existing communication and computer components to trap and monitor line control protocol whereby the control operating sequence may be recounted for system compatibility.

In addition, it is highly desirable to monitor the presence of certain control line signals and line performance. Although a number of test systems exist, these are generally costly and often interfere with the performance of the data telecommunications system.

SUMMARY OF THE INVENTION

This invention relates to a protocol analyzer for monitoring line control characters in binary synchronous data telecommunications systems. More specifically, the protocol analyzer comprises control character trap means, interface test means and analog test means.

The control character trap means includes character decode means, character memory means, control means and display means. The character decode means includes circuitry to serially scan binary bits from a business machine or modem to detect and decode a plurality of predetermined line control characters. The character decode means generates a first output signal, line control character word, upon decoding any of the plurality of predetermined line control characters, a second output signal, character synchronization signal, upon receipt of the predetermined characters in a predetermined pattern, a third output signal, abandon synchronization control, upon decoding a selected number of the plurality of predetermined line control characters, a fourth output signal, inhibit control, upon decoding of a second plurality of predetermined characters.

The control means includes character synchronizer means, abandon synchronization means, input inhibit means, input control means and mode control means.

The character memory means comprises a plurality of recirculating shift registers, each shift register corresponds to one of the predetermined line control characters. The mode control means includes switching means to select one of several operating modes. These modes include a "hold" mode which registers the first 30 line control characters and stops, a "run" which continues to shift the register so long as there is a data flow and traps the last 30 line control characters and a "selective stop" mode where the register traps control characters until a preselected "stop" character is received. The interface test means comprises circuitry coupled between the terminal, modem and telephone data access lines to a monitor important RS-232 control lines and auto answer DAA control lines. The interface test means includes indicator means to automatically display the various "on-line" signals during operation of the data communications system.

The analog test means comprises circuitry means and first and second indicator means to provide both audio and visual monitoring capability of certain communication lines operating characteristics.

To operate, the bisync analyzer is coupled in series with the data stream between the terminal equipment and modem. The desired operating mode is selected and the terminal equipment is activated. Once the data stream is generated, the character decode means decodes and identifies the predetermined plurality of line control characters in either direction. When two predetermined line synchronization characters are detected consecutively, the character decode means generates the synchronization control signal causing the character sync means to generate a character sync clock pulse. Once character sync is established, the input control means will normally generate a "write" command when the mode control is in the write mode causing line control characters to shift into the character memory means. During operation, the control characters are shifted through the memory means such that the thirty most recent characters are stored in sequential order. In the "hold" mode, the registers will automatically stop after the first 30 characters are received. The registers will continue to shift so long as there is data flow or until the end of the transmission or stopped manually when in the "run" mode. In the "selective stop" mode the register will accept data until a preselected stop character is detected and decoded.

When any one of the second plurality of predetermined characters is received, the input control is disabled by an inhibit signal from the input inhibit means generated in response to the fourth output signal received from the character decoder.

The abandon sync means will generate an abandon sync signal causing the character sync means to lose character sync when the third output signal is received from the character decoder.

The display means includes a plurality of indicators comprising a matrix of 13 rows and five columns. Each column corresponds to a register or memory position. The top row indicates whether the character stored in that position was transmitted or received. The remaining twelve rows correspond to eleven preselected fixed binary synchronous line-control characters and one selectable character which may be set by a thumbwheel switch means.

With the mode control means in the "read" mode, the trapped control characters may be viewed on the display matrix by stepping the memory means manually, one position at a time, through the display matrix. A column counter indicates which register position is displayed in column one of the display. This counter is always set to zero when the "read" mode is selected. The memory means is recirculated through the display matrix so that stored characters may be reviewed repeatedly. The net effect of this arrangement is that after the first step, column 1 of the display holds the oldest characters stored and the column counter indicated a count of one.

During the operation of the protocol analyzer the interface test means monitors and displays the presence of the plurality of predetermined signals from the RS-232 and DAA control lines. The analog test means includes a visual indicator means to display the DC voltage or dBm applied across the external or DCV terminals. In the DC select mode the volts applied across the DCV terminals are measured while in the dBm position the meter measures the line signal level. In addition, the audio means allows the operator to listen to the line signal while the modem is in the data mode. This is useful to determine signal clipping and line noise.

Since the actual line control characters may be observed in the sequence received, it is possible to compare those actually received to the proper sequence to isolate and determine the failures due to incompatible protocol between the various data telecommunications subsystems. Thus, the problem of downtime generally associated with the inability to isolate such problems is overcome greatly enhancing the effectiveness and the operational capabilities of the various data telecommunications systems.

BRIEF DESCRIPTION OF THE DRAWINGS

For a fuller understanding of the nature and objects of the invention, reference should be had to the following detailed description taken in connection with the accompanying drawings in which:

FIG. 5 is a tabulation of hexidecimal character conversion.

FIG. 10 shows the multiple record transparent text.

Similar reference characters refer to similar parts throughout the several views of the drawings.

DETAILED DESCRIPTION OF THE PREFERRED EMBODIMENT

Figure 1:
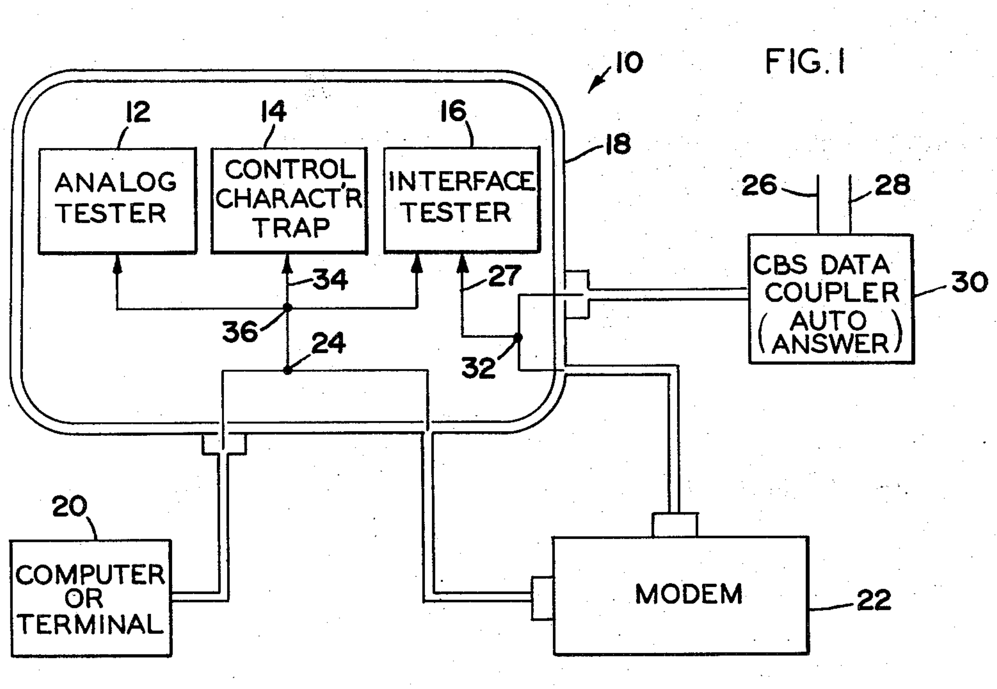
FIG. 1 is a block diagram of the protocol analyzer.

As shown in FIG. 1, the binary synchronous protocol analyzer (BSA) generally indicated as 10 comprises analog test means 12, control character trap means 14 and interface test means 16 arranged within enclosure 18. Computer or terminal equipment 20 is connected to modem 22 and analog test means 12, control character trap means 14 and interface test means 16 through junction 24. Data communications lines 26 and 28 are coupled through telephone data access arrangement 30 to modem 22 and interface test means 16 through junction 32.

Figure 2:
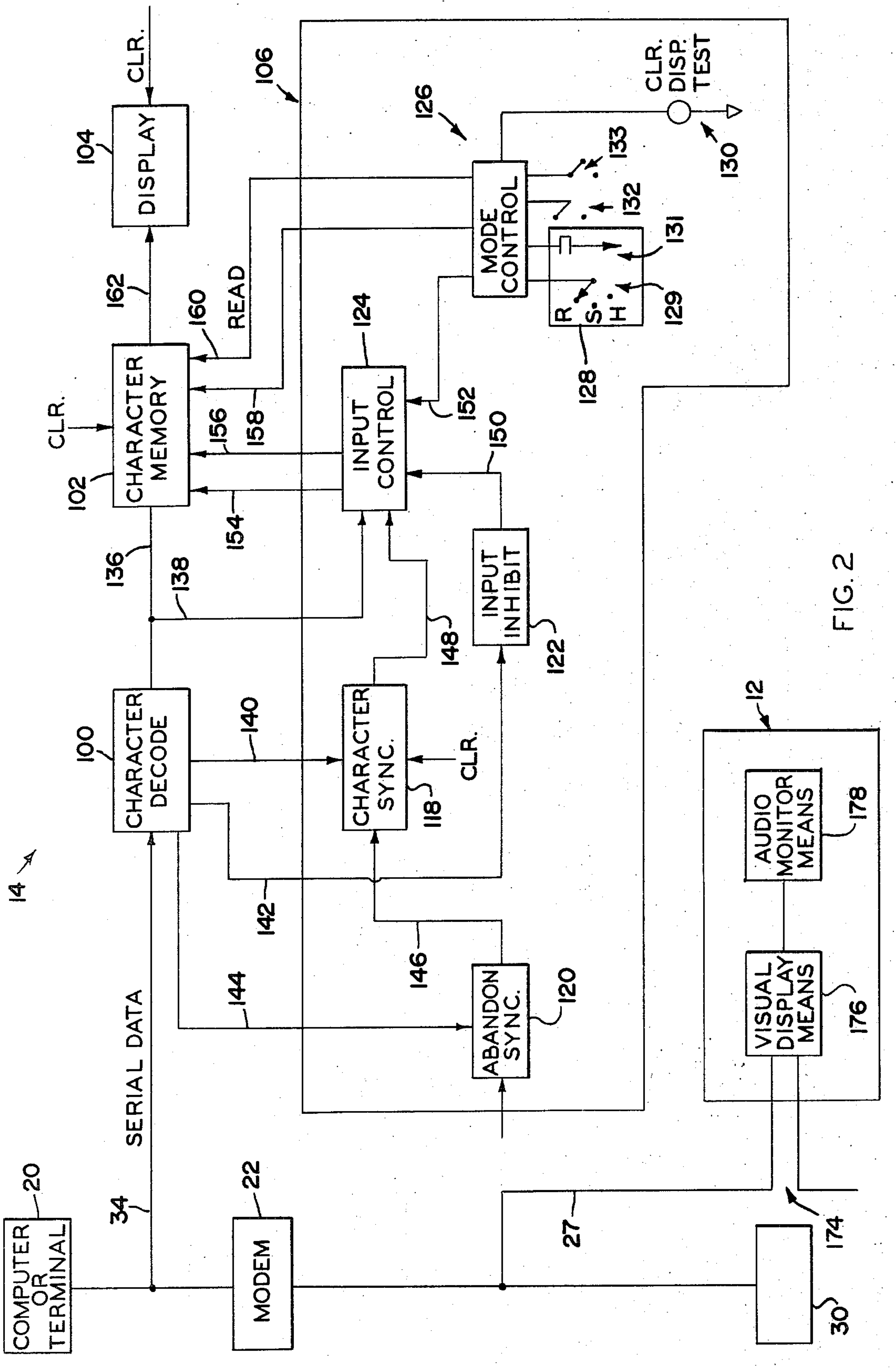
FIG. 2 is a detailed block diagram of the protocol analyzer.

As shown in FIG. 2, control character trap means 14 comprises character decode means 100, character memory means 102, character display means 104 and control means 106.

Character decode means 100 includes logic circuitry (not shown) to scan data serially to decode and recognize a plurality of predetermined line control characters and generate a first output signal or character word. The character word comprises 13 bits fed in parallel to character memory means 102 as more fully described hereinafter. In the preferred embodiment, character decode means 100 is designed for EBCDIC code to recognize the following control characters:

| | |
|---|---|
| ENQ | ACKO* |
| STX/SOH | ACKI* |
| IUS | NAK |
| ETB/ETX | RVI |
| EOT | WACK |
| DLE | SELECT |

The EBCDIC codes for ACKO and ACKI are DLE, 70 and DLE, 61 respectively. The trap captures and displays both the DLE character and the 70 or 61 character. The rows labeled ACKO and ACKI indicate detection of a 70 or 61 immediately following a DLE. Thus, acknowledgements will be displayed as DLE, ACKO and DLE, ACKI respectively. The "SELECT" character is selected by means of a thumbwheel switch more fully described hereinafter. The select character may be any character from hexadecimal 00 to hexadecimal FF as shown in FIG. 5. The logic circuitry also includes means to generate a second output signal or synchronization pulse when two synchronization characters are decoded and received consecutively. A third output signal or abandon synchronization pulse is generated upon decoding and identification of any of the following "turn around" line control characters:

| | |
|---|---|
| ENQ | EOT |
| ACKO | RVI |
| ACKI | WACK |
| NAK | ETX |

A fourth output signal or inhibit pulse is generated upon receipt and decoding of a block check character, stop signal or line control character when operating in the transparent mode.

Figure 3:
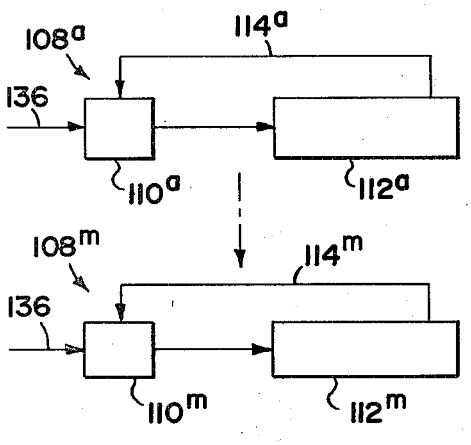
FIG. 3 is a detailed block diagram of the character memory means.

As shown in FIG. 3, character memory means 102 comprises 13, 30 position shift registers 108*a* through 108*m* which cooperatively form a 30 × 13 memory matrix. As shown in the preferred embodiment, each shift register comprises a 5 character shift resister 110*a* through 110*m* and a 25 position shift register 112*a* through 112*m* coupled in series. The character memory means 102 also includes a feed-back or memory loop 114 to continuously retain the 30 characters captured and recycled as described more fully hereinafter. Shift register 110*a* indicated whether the control character at that position was received or transmitted. Shift registers 110*b* through 110*j* correspond to the fixed control characters, while shift register 110*m* corresponds to variable select characters.

Figure 4:
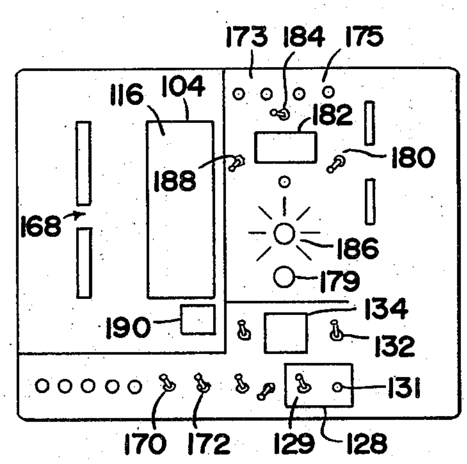
FIG. 4 is a view of the front control panel.

As best shown in FIG. 4, display means 104 comprises a plurality of indicators 116 arranged in 13 horizontal rows and 5 vertical columns cooperatively forming a 13 × 5 display matrix corresponding to first shift registers 110*a* through 110*m*. Five of the register positions are displayed by means of a matrix of indicators consisting of 13 rows with five columns in each row. The top row is labeled TX and indicates when lit, that the character stored in that position was transmitted; if it is not lit, the corresponding character was received. The remaining 12 rows correspond to 11 preselected fixed binary synchronous line control characters and one selectable character which may be set at thumbwheel means. Thus, the identity of a control character occupying a position in the register is shown by the row-indicator that is turned on for that position.

As shown in FIG. 2, control means 106 comprises character synchronizer means 118, abandon synchronization means 120, input inhibit means 122, input control means 124 and mode control means generally indicated as 126. Mode control means 126 includes a first switching means comprising mode control switch 128, clear/display test switch 130, stop control switch 132 and select switch 133. Mode control switch 128 comprises three position control switch 129 and step switch 131. Mode control means 126 also includes a second switching means comprising fourth switch 134 (thumbwheel switch) used to "select" the variable character for display (FIG. 4).

"Hold" mode wherein the character memory means 102 traps the first thirty line control characters and stops, "Run" mode wherein the character memory means 102 continues to shift in line control characters so long as there is data flow trapping the last thirty control characters received; or "Selective stop" mode wherein the character memory means 102 continues to trap control characters until a preselected "STOP" character is received stopping with this character in fifth column of the display matrix. Control character trap means 14 is coupled through conductor 34 and junctions 36/24 to computer/terminal 20 and modem 22 to receive data serially (FIG. 1). As shown in FIG. 2 character decode means 100 is coupled to character memory means 102 through conductor 136 and through conductors 138, 140, 142 and 144 to control means 106. More specifically, first output signal is fed to character memory means 102 and input control means 124 through conductors 136 and 138 respectively. Although conductor 136 is depicted as a single line, conductor 136 comprises thirteen parallel lines, each line coupled to its respective register 110. The second, fourth and third output signals are fed through conductors 140, 142 and 144 to character sync means 118, input inhibit means 122 and abandon sync means 118 through conductor 146. Input control means 124 is coupled to character sync means 118, input inhibit means 122 and mode control means 126 through conductors 148, 150 and 152 respectively.

A "write" command signal (more fully described hereinafter) from input control means 124 is fed to character memory means 102 through conductors 154 and 156, while a "read" command signal (more fully described hereinafter) is fed from mode control means 126 through conductors 158 and 160. The display output signal is fed from character memory means 102 through conductor 162 to display means 104.

Character sync means 118 includes logic circuitry (not shown) to generate a clock pulse signal in response to the second output signal from the character decode means 100. Abandon sync means 120 includes logic circuitry (not shown) to generate an abandon sync pulse signal in response to the third output signal from the character decode means 100. Input inhibit means 122 includes logic circuitry (not shown) to generate an inhibit pulse signal in response to the fourth output signal from character decode means 100.

Figure 6:
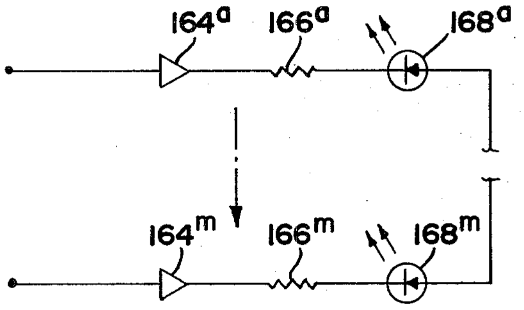
FIG. 6 is a schematic of the interface test means.

As shown in FIG. 6, interface test means 16 comprises a plurality of signal drives 164*a* through 164*m*, resistors 166*a* through 166*m* and lamp means 168*a* through 168*m*, each corresponding signal drive 164, resistor 166 and lamp 168 means is connected through junction 24 to one of the following control lines:

| RS-232 | Auto Answer DAA |
|---|---|
| Data Terminal Ready (DTR) | Ring Indicator (RI IN) |
| Data Set Ready (DSR) | Switch Hook (SH) |
| Request to Send (RTS) | Data Available (DA) |
| Clear to Send (CTS) | Off Hook (OH) |
| Carrier Detect (CAR DET) | Coupler Cut Through (CCT) |
| Ring Indicator (RI OUT) | |

The RS-232 lines are automatically displayed when BSA is placed in series with the terminal 20 and modem 22 through junction 24. To display the DAA lines, the DAA 30 must be coupled through junction 32 to modem 22 as shown in FIG. 1.

As shown in FIG. 4, interface test means 16 includes switches 170 and 172 to control the state of the RTS and DTR lines. In the "normal" or first position the BSA simply passes the state of these lines along to modem 22. In the "off" or second position the lines are forced "off" and in the "on" position the lines are forced "on". The switching arranging is accomplished by means commonly known in the industry and therefore not shown.

As shown in FIG. 2, analog test means 12 is connected between modem 22 and data access arrangement 30 through conductor 27. Alternatively, analog test means 12 may be connected to the modem 22 line terminal through external terminal 174. Analog test means 12 comprises visual display means 176 and audio monitor means 178. As shown in FIG. 4, source switch 180 allows selection of the transmit pair or receiver pair from DAA conductor 27 or external terminals 174. Audio monitor means 178 comprises an audio amplifier and speaker (not shown) which permits the operator to listen to the line signal when modem 22 is in data mode. This is useful to determine if the signal is being severely clipped, if the modem is transmitting, if the remote end has switched to voice or if there is noise on the line. Audio monitor means 178 is controlled by "on/off," volume control switch 179.

As shown in FIG. 4, visual indicator means 176 includes meter 182 to measure DC volts or dBm by selecting the proper mode on meter select switch 184. In the first or volt measuring position, the voltage applied to the terminals 175 is measured and indicated on meter 176. In the dBm position, the meter 176 measures the line signal. Analog test means 12 includes range scale switch 186. The range of the dBm scale is −6 to +1 dBm. The range switch 186 extends the range to −36 dBm to +1 dBm. For a given setting of the range switch 186, the selected dBm range value is added to the meter reading to get the true reading (i.e., if the range selected is −20 dBm and the meter reads −4 dBm, the true reading is −20 + (−4) = −24 dBm.

In addition 600 OHM load switch 188 allows the operator to place a 600 OHM load across the source. This is used to simulate the phone-line impedance when measuring transmit signal level when the modem 22 is not connected to the line. When the modem 22 is connected to the line, switch 188 should be in the "OFF" position to avoid excessive loading of the modem output.

To operate, the BSA is connected in series with the data stream as shown in FIG. 1. The BSA can operate in either a 2-wire or 4-wire mode. The desired operating mode is selected as follows:

Hold mode — select "hold" position on control switch 129 and "Off" position on stop control switch 132.

Run mode — Select "run" position on control switch 129 and "off" position on stop control switch 132.

Select stop mode — Select desired character in hexadecimal form (FIG. 5) on switch 134, "run" position on control switch 129, "on" position on select switch 133, and "select" or "DLE, Select" on stop control switch 132. When the Stop Control switch 132 is in "DLE, Select" position, the selected character must be preceded by a DLE for the trap to stop. This is the position required for stopping on the selected character when the data stream is in transparent mode or when required to stop on a positive acknowledgment (ACKO, ACKI, RVI or WACK). The "Select" position, causes the trap to stop on the selected character alone, and is used for the non-transparent mode of transmission.

Instead of specifying the stop character, switch 134 can be used to select a character for display. To do this, the "Stop Control" switch 132 is set to "OFF" and the "Select" switch 133 is set to "ON". The row labeled select will then indicate whenever the character dialed on switch 134 occur.

Figure 7:
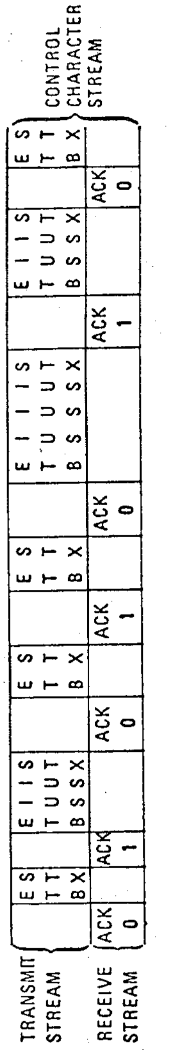
FIG. 7 shows the control character stream.
Figure 8:
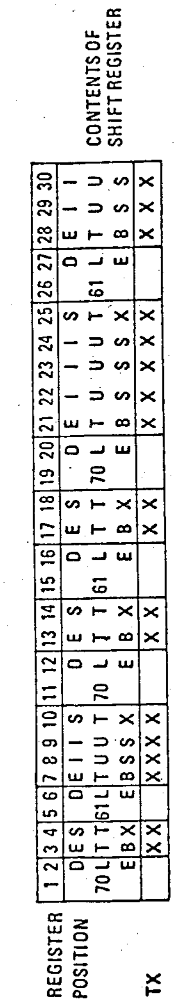
FIG. 8 shows the contents of shift register.

When the operating mode is selected, the terminal equipment or computer 20 is then started. The operation can best be understood with reference to FIGS. 7 through 9. As the data stream is received through conductor 34 (FIG. 7) character decode means 100 decodes and identifies the predetermined plurality of line control characters in either direction. When two predetermined synchronization characters are detected in consecutive succession, character decode means 100 generates the second output signal which is fed to character sync means 118 to generate the sync pulse. The sync pulse is in turn fed to input control means 124. Simultaneously the first output signal is fed to input control means 124 and character memory means 102. In the absence of the third output signal, input inhibit means 122 generates an "enable" signal. In this condition, input control means 124 generates a "write" command to character memory means 102. This permits each bit of line control character word to be stored in the first position of the respective shift registers 110. During transmission, the control character words are shifted through character memory means 102 such that the 30 most recent characters are stored in sequential order as illustrated in FIG. 8. As shown in the lower portion of FIG. 8, the character word will include transmit bit information if the control character was transmitted from the local modem 22.

Character decode means 100 will generate the third output signal in response to any of the turn around characters previously enumerated. Abandon sync means 120 will then generate an abandon sync pulse causing character sync means 118 to lose character sync. In addition, an abandon sync pulse will be generated in response to a transmission of the "request to send" signal through conductor 119. Further, upon decoding a block check character, "select" select stop character or control character when operating in the transparent mode, character decode means 100 generates the fourth output signal causing input inhibit means 122 to generate an inhibit pulse to disable input control means 124. With input control means 124 disabled, no line control characters are stored. As shown in FIG. 10, when operating in the transparent mode line control characters must be preceded by a DLE character to be stored in character memory means 102.

To "read" the stored characters, trap 14 must be stopped and control switch 129 placed in the "step" position. In the "read" mode, all 30 trapped control characters may be viewed on display matrix 104 (FIGS. 3 and 9) by stepping character memory means 102 manually, one position at a time, through matrix 104 by actuating step switch 131.

Figure 9:
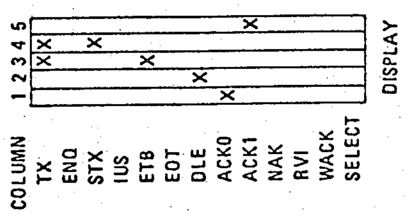
FIG. 9 shows the display matrix.

When in the "step" mode the read enable signal is fed to character memory means through conductor 160 illuminating lamps 116 as shown in FIGS. 3 and 9. By actuating step switch 131 the memory address shift pulse is fed to memory means causing the trapped characters to advance or shift within shift registers 110.

As shown in FIG. 4, column counter 190 indicates which register position is displayed in column 1 of the display. Counter 190 is always set to zero when the "step" mode is selected. When in the step mode characters from position thirty of register 110 are fed back to position one through loop 114 so that the stored characters are recirculated through display matrix 104 for repeated viewing. The net effect of this arrangement is that after the first step, column one of display holds the oldest characters stored and the column count indicates a count of one.

To clear trap 14, clear/display test switch 130 is actuated generating a clear pulse which is fed to character sync means 118, character memory means 102 and display means 104 as shown in FIG. 2.

Since the actual line control characters may be observed in the sequence received, it is possible to compare those actually received to the proper sequence to isolate and determine the failures due to incompatible protocol between the various data telecommunications subsystems. Thus, the problem of downtime generally associated with the inability to isolate such problems is overcome, greatly enhancing the effectiveness and the operational capabilities of the various data telecommunications system.

It will thus be seen that the objects set forth above, among those made apparent from the preceding description, are efficiently attained, and since certain changes may be made in carrying out the above method and article without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

What is claimed is:

1. A data telecommunications analyzer for monitoring data characters within a data stream: said data telecommunication analyzer comprising character trap means including character decode means having circuitry to decode and identify any of a first predetermined plurality of data characters, said circuitry generating a first output signal corresponding to the specific predetermined data character received and a second output signal upon receipt of any of said first predetermined data characters in a predetermined pattern, character memory means coupled to said character decode means to receive and store said first output signal, display means coupled to said character memory means to display at least a portion of said plurality of predetermined data characters and control means coupled to said character decode means and said character memory means, said control means including mode control means to alternately select a read or write operating mode.

2. The data telecommunications analyzer of claim 1 wherein said control means generates write command when said mode control means is in said write mode and a read command when said mode control is in said read mode.

3. The data telecommunications analyzer of claim 2 wherein said control means further including character synchronizer means and input control means, said character synchronizer means coupled to said character decode means and said input control means, said mode control means coupled to said input control means, said character synchronizer means including circuitry to generate a synchronization pulse in response to said second output signal, said input control means including circuitry to generate said write command signal in response to said synchronization pulse when said mode control is in said write mode to enable said memory means to store said first signal.

4. The data telecommunications analyzer of claim 3 wherein said mode control means includes first switching means, said switching means including first switch to alternately select said write or said read mode, and second switch to generate said read command, said control means generating said read command signal in response to actuation of said second switch when said first switch is in said read mode.

5. The data telecommunications analyzer of claim 1 wherein said character decode means circuitry generates a third output signal in response to receipt of a preselected number of said predetermined plurality, said control means further including abandon synchronization means coupled to said character decode means and said character synchronization means, said abandon synchronization means including circuitry to receive said third output signal and generate an abandon synchronization pulse in response thereto, said abandon synchronization pulse being fed to said character synchronization means to abandon synchronization.

6. The data telecommunications analyzer of claim 1 wherein said character decode means circuitry generates a fourth output signal in response to receipt of a second predetermined plurality of data characters, said control means further including input inhibit means coupled to said character decode means and input control means, said input inhibit means including circuitry to receive said fourth output signal and generate an inhibit pulse signal in response thereto, said inhibit pulse signal being fed to said input control means to disable said write command signal when said mode control is in said write mode.

7. The data telecommunications analyzer of claim 2 wherein said character memory means comprises shift register means to store said first output signals sequentially as received from said character decode means.

8. The data telecommunications analyzer of claim 7 wherein said shift register means comprises a plurality of shift registers, each said shift register corresponding to one of said first predetermined plurality of characters and wherein said first output signal comprises a multiple bit character word fed to said shift registers in parallel, each bit of said character word corresponding to one of said first predetermined plurality of characters.

9. The data telecommunications analyzer of claim 8 wherein said write command comprises an enable pulse and shift pulse and said shift registers each comprises a plurality of positions such that said character words are advanced through said shift registers sequentailly as said character words are received.

10. The data telecommunications analyzer of claim 8 wherein said display means comprises a plurality of visual indicator means cooperatively forming a matrix of rows and columns, said visual indicator means coupled to said character memory means such that each said row corresponds to one of said first predetermined characters and each said column corresponds to the relative position within said shift registers whereby said display matrix displays said first predetermined characters in relative positions as received.

11. The data telecommunications analyzer of claim 10 wherein each said shift register comprises a first and second shift register coupled in series, said first and second register coupled by feedback loop, said display matrix being coupled to said corresponding first shift register such that said character words may be advanced through said first and second shift registers and recirculated for repeated viewing upon actuation of said second switch of said first switching means.

12. The data telecommunications analyzer of claim 8 wherein said read command comprises an enable signal and a memory address advance pulse to advance said character words through said shift register on actuation of said second switch of said first switching means.

13. The data telecommunications analyzer of claim 12 wherein said control means further includes counter means coupled to said display means to visually display the sequential order of said character word as received in the first position of said shift registers.

14. The data telecommunications analyzer of claim 4 wherein said mode control means further includes third switch to clear data characters from said character memory means, and said display means upon actuation thereof.

15. The data telecommunications analyzer of claim 1 wherein said mode control means includes a second switching means coupled to said character decode means and said character memory means, said mode control means including circuitry such that at least one of said predetermined characters may be varied by said second switching means.

16. The data telecommunications analyzer of claim 1 wherein said predetermined pattern comprises at least two of said first predetermined plurality of characters received consecutively.

17. The data telecommunications analyzer of claim 1 wherein said first output signal comprises a character word including a plurality of bits corresponding to one of said first predetermined plurality of characters, such that each said character word has identity with one of said first plurality of predetermined characters.

18. The data telecommunications analyzer of claim 17 wherein at least one bit of said character word indicates the origin of said character word.

19. The data telecommunications analyzer of claim 1 further including interface test means including circuit means and visual indicator means coupled to the date transmission lines to receive and indicate the presence of preselected control line signals.

20. The data telecommunications analyzer of claim 1 further including analog test means including circuit means and indicator means to monitor transmission line signal performance.

21. The data telecommunication analyzer of claim 20 wherein said indicator means comprises audio indicator means and visual indicator means.

* * * * *